No. 756,430. PATENTED APR. 5, 1904.
F. A. THOMAS & L. F. THOMPSON.
FRONT AXLE COUPLING.
APPLICATION FILED OCT. 11, 1902.
NO MODEL.
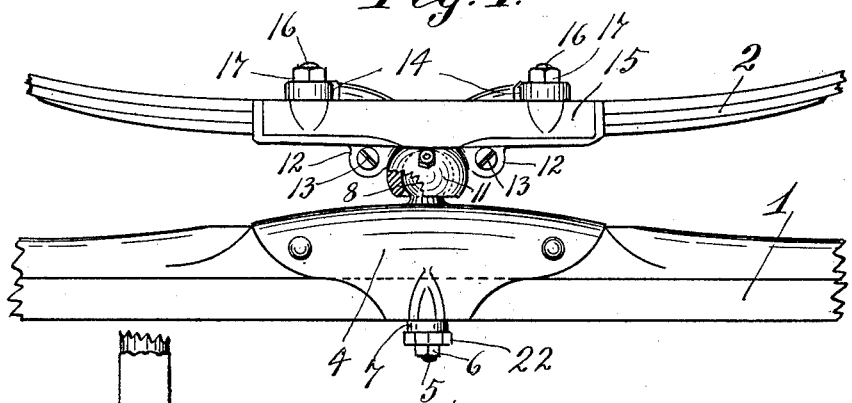
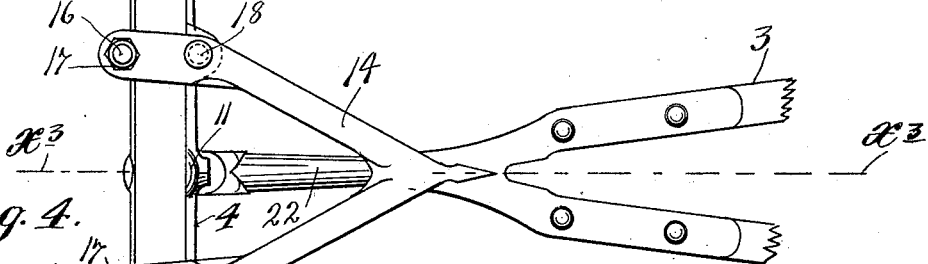
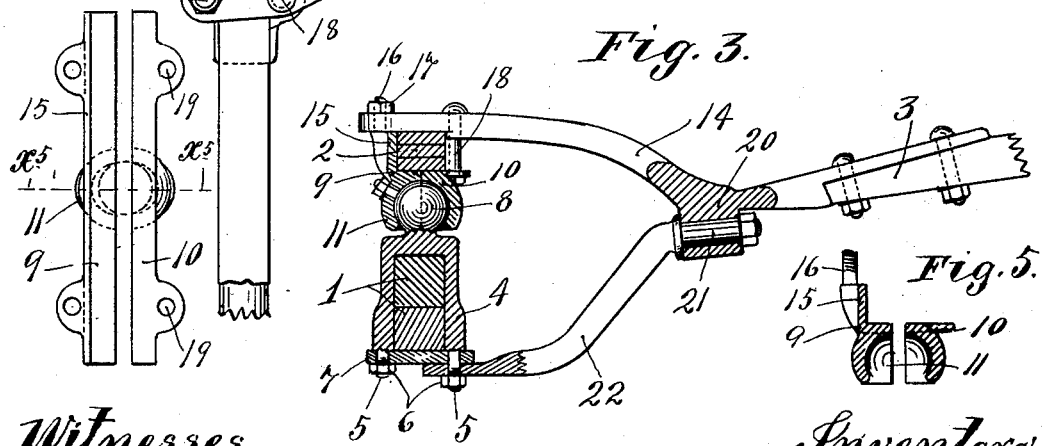
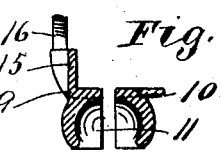
Witnesses
A. H. Opsahl
H. D. Kilgore
Inventors
F. A. Thomas
L. F. Thompson
By their Attorneys
Williamson & Merchant No. 756,430.

Patented April 5, 1904.

UNITED STATES PATENT OFFICE.

FRANK A. THOMAS AND LEVI F. THOMPSON, OF ROCKFORD, MINNESOTA.

FRONT-AXLE COUPLING.

SPECIFICATION forming part of Letters Patent No. 756,430, dated April 5, 1904.

Application filed October 11, 1902. Serial No. 126,857. (No model.)

*To all whom it may concern:*

Be it known that we, FRANK A. THOMAS and LEVI F. THOMPSON, citizens of the United States, residing at Rockford, in the county of Wright and State of Minnesota, have invented certain new and useful Improvements in Front-Axle Couplings; and we do hereby declare the following to be a full, clear, and exact description of the invention, such as will enable others skilled in the art to which it appertains to make and use the same.

Our invention has for its object to provide an improved device for pivotally connecting the front axle of a vehicle to the body-support and to the reach whereby the axle is free for oscillations in a vertical plane as well as for such oscillations as are required in turning or running the vehicle on a curve.

This device takes the place of what is known as the "fifth-wheel" of the vehicle, and hence we style the same a "flexible fifth-wheel coupling" for vehicles.

The invention consists of the novel devices and combinations of devices hereinafter described, and defined in the claim.

The invention is illustrated in the accompanying drawings, wherein like characters indicate like parts throughout the several views.

Figure 1 is a front elevation with some parts broken away, showing the improved device applied to connect the front axle, the body-support, and the reach of the vehicle. Fig. 2 is a plan view of the parts shown in Fig. 1. Fig. 3 is a vertical section on the line $x^3$ $x^3$ of Fig. 2. Fig. 4 is a plan view of the upper center bearing, and Fig. 5 is a transverse section on the line $x^5$ $x^5$ of Fig. 4.

The numeral 1 indicates the front axle, the numeral 2 the body-support, and the numeral 3 the reach, of the vehicle.

The lower center bearing 4, which is of channel-like form and is provided at its sides with depending screw-threaded gudgeons 5, embraces the central portion of the axle 1 and is tightly clamped thereto by nuts 6 on said gudgeons and a clamping-bar 7, through which the said gudgeons are passed. On its top the bearing 4 is formed with a ball or spherical head 8, which forms one member of the ball-and-socket joint. The upper center bearing is formed in two sections 9 and 10, which members are each formed with one-half of a divided socket 11 and which socket receives the ball 8. The two sections 9 and 10 are provided with perforated ears 12, through which short nutted bolts 13 are passed to rigidly clamp the said sections together. Said sections 9 and 10 are rigidly secured to the central portion of the body-support, which, as illustrated, is a spring 2, as follows: The forward end of the reach 3 is provided with diverging metal prongs 14, the ends of which are flattened and perforated and rest on top of the spring 2. The bearing-section 9 is provided with a vertical flange 15, which bears against the forward face of the spring 2, and this flange is provided with a pair of threaded gudgeons 16, which pass through perforations in the forward ends of said prongs 14 and are provided with nuts 17. A pair of nutted bolts 18 are also passed through the said prongs 14 and through perforated ears 19 of the bearing-section 10. Thus the bearing-sections 9 and 10 are clamped together and rigidly secured both to the spring 2 and to the prongs 14 of the reach 3, and the said spring and the axle 1 by the ball-and-socket joint are pivotally connected for free movements both in a horizontal plane transversely of the carriage or longitudinally of the said axle and bolster.

The reach 3, preferably at the junction of its prongs 14, is provided with a bearing 20, in which is swiveled the trunnion 21 of a crank-like supplemental reach-section 22, the forward end of which is pivotally connected to the axle 1. Preferably the pivotal connection between the axle 1 and the forward end of the crank or supplemental section 22 is formed by passing the rear gudgeon 5 of the center bearing 4 through the flattened forward end of said section 22, as best shown in Fig. 3. The swiveled crank or supplemental reach-section 22 holds the axle 1 against rotation or oscillatory movements from front to rear of the vehicle or, in other words, longitudinally of the reach.

The great advantage of the above construction is that the front axle is left absolutely free for such oscillating movements as it must necessarily make in adapting itself to the irregularities of the road. It therefore follows that with this construction oscillatory movements of the axis in a vertical plane will not throw torsional strains on the body of the vehicle or on any portion of the running-gear or other parts of the vehicle. With the ordinary fifth-wheel now in general use oscillating movements of the front axle in a vertical plane cramp the bearing parts thereof and tend to produce torsional strains on the vehicle body or frame.

It will of course be understood that the device described is capable of many modifications within the scope of our invention as herein set forth and claimed.

In the drawings the so-called "body-support" is shown as in the form of a leaf-spring 2. This body-support may, however, take various forms. In some cases it would be a body-bolster detachable from the carriage-body, and in other cases it might be a rigidly-secured part of the body.

What we claim, and desire to secure by Letters Patent of the United States, is as follows:

The combination with a front axle and cooperating body-support and a reach of a vehicle, of the center bearing 4 provided with the spherical ball 8 and rigidly secured to said axle, the two-part bearing 9 10 having the divided socket 11 and rigidly secured to said body-support and to the forward end of said reach, said socket 11 receiving said ball 8, and the supplemental crank 22 swiveled to said reach and pivoted to the lower portion of said axle, substantially as described.

In testimony whereof we affix our signatures in presence of two witnesses.

FRANK A. THOMAS.
LEVI F. THOMPSON.

Witnesses:
ADELBERT L. OMERA,
D. D. AMES.